(12) United States Patent
Sendlinger et al.

(10) Patent No.: US 8,452,525 B2
(45) Date of Patent: May 28, 2013

(54) WEIGHING SYSTEM AND METHODS OF OPERATING SUCH WEIGHING SYSTEM

(75) Inventors: Johann Sendlinger, Wertingen (DE); Markus Wahnfried, Furstenfeldbruck (DE)

(73) Assignee: Eurocopter, Deutschland GmbH, Donauwoerth (DE)

( * ) Notice: Subject to any disclaimer, the term of this patent is extended or adjusted under 35 U.S.C. 154(b) by 0 days.

(21) Appl. No.: 13/239,451

(22) Filed: Sep. 22, 2011

(65) Prior Publication Data

US 2012/0116660 A1 May 10, 2012

(30) Foreign Application Priority Data

Nov. 9, 2010 (EP) .................................. 10400055

(51) Int. Cl.
G06F 19/00 (2011.01)
B64D 47/00 (2006.01)
B64C 25/52 (2006.01)
G01M 1/12 (2006.01)
G01G 19/07 (2006.01)

(52) U.S. Cl.
CPC ............... *G01M 1/125* (2013.01); *G01G 19/07* (2013.01)
USPC .......................................... 701/124; 244/108

(58) Field of Classification Search
CPC ........ G01M 1/125; G01M 1/127; G01G 19/07; G01G 19/12; B64D 1/22; B64C 2025/325; B64C 25/52
USPC .......................................... 701/124; 244/108
See application file for complete search history.

(56) References Cited

U.S. PATENT DOCUMENTS

| | | | |
|---|---|---|---|
| 4,553,719 A | 11/1985 | Ott | |
| 4,574,360 A * | 3/1986 | Bateman | 702/174 |
| 4,637,575 A | 1/1987 | Yenzer | |
| 4,780,838 A | 10/1988 | Adelson | |
| 4,850,552 A * | 7/1989 | Darden et al. | 244/100 R |
| 5,109,580 A | 5/1992 | Camus | |
| 6,415,242 B1 * | 7/2002 | Weldon et al. | 702/173 |
| 7,281,418 B2 * | 10/2007 | Mardirossian | 73/65.05 |
| 7,538,281 B2 * | 5/2009 | Pottebaum et al. | 177/211 |
| 7,890,249 B2 * | 2/2011 | Davis et al. | 701/124 |
| 7,954,766 B2 * | 6/2011 | Brainard et al. | 244/194 |
| 7,967,244 B2 * | 6/2011 | Long et al. | 244/100 R |
| 8,226,030 B2 * | 7/2012 | Mast et al. | 244/108 |
| 2006/0283239 A1 * | 12/2006 | Leroy et al. | 73/65.05 |
| 2008/0011091 A1 * | 1/2008 | Weldon, Jr. | 73/766 |
| 2010/0063718 A1 | 3/2010 | Schmidt | |

FOREIGN PATENT DOCUMENTS

WO 9316359 A1 8/1993
WO 2006022700 A1 3/2006

OTHER PUBLICATIONS

Search Report and Written opinion: Application No. EP 10400055 dates: May 9, 2011.

* cited by examiner

*Primary Examiner* — James Trammell
*Assistant Examiner* — Todd Melton
(74) *Attorney, Agent, or Firm* — Brooks Kushman P.C.

(57) ABSTRACT

A weighing system for detecting total weight, including optional external loads, and monitoring of center of gravity of a helicopter (2), comprising a fuselage (1), a landing gear (4), mounted to the fuselage (1) by flanges (10-13) and weighing cells (41-44). The weighing cells (41-44) are integral with the flanges (10-13) between the fuselage (1) and the landing gear (4). Attachment means are provided at the landing gear (4) for external loads (39, 40).

16 Claims, 4 Drawing Sheets

WEIGHING SYSTEM AND METHODS OF OPERATING SUCH WEIGHING SYSTEM

CROSS REFERENCE TO RELATED APPLICATION

This application claims the benefit of EP 10 400055.9 filed on Nov. 9, 2010, the disclosure of which is incorporated in its entirety by reference herein.

BACKGROUND OF THE INVENTION (1) Field of the Invention

This invention relates to a weighing system as part of a helicopter, particularly to a weighing system taking into account as well external loads of the helicopter with the features of the preamble of claim 1 and methods of operating such a weighing system with a function in the same system to take into account as well external loads of the helicopter with the features of the preamble of claim 11.

(2) Description of Related Art

Critical factors in the flight or at take off of any aircraft are the weight and balance of such an aircraft. An aircraft manufacturer must insure that sufficient lift is generated at take-off to lift the weight of the airplane. A second but equally important factor to consider is whether the aircraft is in balance, i.e. whether the location for the center of gravity of the aircraft is within allowable limits.

Calculations to determine weight and center of gravity of an aircraft are known and documented.

The document U.S. Pat. No. 4,780,838 (A) discloses a helicopter weight and torque advisory system for connection to cargo hook load sensors, fuel flow, air temperature and altitude indicating systems of a helicopter. The advisory system provides the flight crew of the helicopter information as to available engine torque, gross weight, gross weight center of gravity condition and weight supported by each cargo hook as an external sling load is raised and supported by the helicopter. Information as to operating weight empty, fuel weight and center of gravity are to be entered manually. External cargo hook load sensors are provided and displays showing the individual loads supported by each external load hook.

The document EP 0625260 (A1) discloses an onboard system for use in measuring, computing and displaying the gross weight and location/relocation of the center of gravity for an aircraft. Temperature and pressure transmitters and transducers are mounted in relation to each of the landing gear struts for transmission of said temperature and pressure signals to an onboard micro-computer/controller with redundancy for accuracy and failure protection. The system also incorporates a software correction program to correct and compensate for physical changes to strut components due to temperature fluctuations, O-ring seal drag and hysteresis within modern day "shock absorbing" aircraft landing gear struts. The computer makes adjustments for internal temperature changes and drag; converts sustained pressures to the weight supported by each strut, and computes the aircraft's current gross weight and center of gravity. The computer also is pre-programmed to illuminate a "Hard Landing Indicator Light" mounted on the display, when pre-programmed individual strut pressure limits are exceeded and sensed during landing. These pressure readings are stored in the computer memory and can be utilized when the aircraft is inspected and serviced. The use of temperature and pressure transmitters and transducers in relation to each of the landing gear struts renders this state of the art complex, expensive and inefficient for maintenance.

The document US 2010063718 (A1) describes a system for continuous monitoring of center of gravity and total weight of an airplane at rest on the ground. Information from strain gauge transducers located on structural members for the nose wheel and main landing gear is communicated to a computer where calculations are made and data is transmitted to gauges in the airplane cockpit. Range limits for the airplane center of gravity with respect to the center of lift, and also the total airplane weight overload limit are clearly indicated on the respective gauges. A marking on said gauges indicate overload. Said system for continuous monitoring is not suitable for a helicopter with a skid type landing gear. Extra loads outside an airplane are not a configuration to be considered for the design of said airplane of the state of the art.

The document U.S. Pat. No. 4,637,575 A discloses a work platform and helicopter assembly for working on a high-voltage power line such as an EHV power line. A work platform comprising a rectangular base of electrically conductive material is disposed transversely across a pair of helicopter skid tubes that extend longitudinally beneath the helicopter fuselage. The work platform is attached to the skid tubes such that the skid tubes may be laterally displaceable, upon landing, or take-off, with respect to the work platform. The work platform includes a workman supporting portion that extends laterally from the side of at least one skid tube to support a workman working on a high-voltage power line. The work platform, skid tubes and helicopter are electrically connected so that they will all be at the same electrical potential when working on a power line. The work platform may include a portion adapted to carry cargo between the skid tubes. A ballast is provided to the work platform, at the end of the work platform opposite from the workman supporting portion, so as to maintain the helicopter with the lateral center of gravity limits.

The document U.S. Pat. No. 5,109,580 A discloses a clamp assembly primarily designed for the removable attachment of a load supporting device to a skid or like support structure of a helicopter such that additional load or cargo may be mounted exteriorally of the helicopter body and generally between the supporting skid assembly and the cockpit or other interior cargo space. The clamp assembly is removably secured to the load supporting structure and includes two clamp body segments pivotal relative to one another between an open position and a clamped position, the latter being defined by a gripping or clamping of the clamp segment about the generally tubular structure defining the skid assembly.

The document WO 2006022700 A1 discloses a weight-on-gear sensor for use on an aircraft with landing skids having a bracket and a displacement sensor attached to the bracket. The bracket has a center member connecting a first end member to a second end member. The center member has a centerline and the end members extend from the centerline of the center member. Mounting members extend along the centerline of the center member to facilitate attachment of the bracket to a cross tube. The displacement sensor connects the first end member to the second end member. The displacement sensor is parallel to, and offset from, the centerline of the center member so that when a bending moment is applied to the center member the first displacement sensor is either elongated or shortened.

The document U.S. Pat. No. 4,850,552 A discloses a landing gear load sensor for an aircraft having a skid type landing gear. The sensor includes a shear beam having a load bearing area. Structure is provided for mounting the shear beam to the aircraft, such that the load bearing area is disposed adjacent the landing gear. Structure is disposed on the shear beam between the mounting structure and the load bearing area for sensing shear load on the shear beam.

SUMMARY OF THE INVENTION

It is an object of the present invention to provide for a weighing system for detecting total weight and monitoring of center of gravity of a helicopter with an option for taking into account external loads and to provide for at least one method to operate said weighing system with an option for indicating any extra loads to be carried outside of the helicopter.

A solution is provided with a weighing system for detecting and monitoring of center of gravity and weight of a helicopter with the features of claim 1 and a method of operating such a weight system with the features of claim 11.

According to the invention a weight system for detecting total weight, said total weight including optional external loads when the helicopter is in flight and monitoring of center of gravity of a helicopter, is provided with a fuselage of the aircraft and a landing gear, mounted to the fuselage by flanges. Said weighing system comprises weighing cells integral with said flanges. Attachment means for the external loads to the landing gear could be integrated to said flanges of a separate device attached to the landing gear. The advantage of the inventive weighing system with an arrangement of the weighing cells at interfaces between said landing gear and the fuselage allows to weigh all the loads from the fuselage while the aircraft is on the ground and said arrangement allows additionally—without any supplemental equipment—to weigh all external loads attached optionally to said landing gear after said external loads are clear from the ground after take off. For this additional advantageous feature of the inventive system attachment means are provided to fix an external lifting gear for any external loads to the landing gear in order to provide for an exclusive load flow of all loads acting on the helicopter via the weighing cells integral with said flanges. The inventive weighing system with a control unit linked to each of the weighing cells provides as well for the determination of the center of gravity of the helicopter at any time at the ground and during flight taking into account as well external loads once said loads are clear from the ground after take off of the helicopter. Another advantage of the invention is due to the high integration of plural functions at the weighing cells integral with the flanges.

According to a preferred embodiment of the invention the weighing system comprises a control unit with data storage means where the calculations for the center of gravity and total weight are made with connection means from said weighing cells to the control unit and communication means for transfer of data resulting from said calculations in the control unit to at least one display in the helicopter's cockpit to make each weight affecting the helicopter graphically available to its pilot as well as the position of the center of gravity.

According to a further preferred embodiment of the invention the landing gear is a skid type landing gear for helicopters comprising two struts between fuselage and one skid on either side of the helicopter said struts being mounted by means of the flanges with integrated weighing cells to the fuselage. A preferable embodiment of the invention may be the skid type landing gear with two struts between fuselage and one skid on either side of the helicopter said struts being mounted to the fuselage by means of three or four flanges with integral weighing cells.

According to a further preferred embodiment of the invention any of the flanges comprise an essentially annular aluminium casing, with each of said flanges being fixed to the respective bow shaped strut by a respective damping element in order to isolate any movements of the fuselage from the struts and hence protect the struts from vibrations of the fuselage induced by the helicopter's rotors.

According to a further preferred embodiment of the invention the control unit comprises a data amplifier, a data processor with software and a data storage.

According to a further preferred embodiment of the invention the control unit comprises at least one first interface for the connection means from said weighing cells and at least one second interface for the communication means to the displays.

According to a further preferred embodiment of the invention the control unit comprises at least one external interface for programming and loading/reading of data.

According to a further preferred embodiment of the invention the control unit comprises an option for at least one interface towards a maintenance system.

According to a further preferred embodiment of the invention the weighing cells comprise commercially available strain gauges.

According to a further preferred embodiment of the invention a load hook is provided, said load hook being mounted to the landing gear by means of a system of bars or ropes, the weight of said load hook being detectable by said weighing cells after take off of the aircraft.

The invention further provides for a method to operate the inventive system by detecting the net weight of the helicopter by means of the weighing cells, transmitting said detected net weight via the at least one first interface for the connection means from said weighing cells to the control unit for storing said detected net weight in the data storage of said control unit and presenting said detected net weight via communication means in the display. The pilot may then set a reference point via the input means at the display via the at least one second interface for the communication means in said control unit in order to memorize said net weight for use. During fuelling of the helicopter, the inventive system allows to detect in real time the increasing weight of the helicopter and allows to transmit and to store the fuel weight the same way as the net weight of the helicopter by subtracting by means of the data processor the net weight of the helicopter from the transmitted weight signal after fuelling. The pilot may then set another reference point via the input means at the display. The same method applies to any further supplemental load, such as passengers or cargo that may be added to the helicopter before take off. The inventive method allows appropriate analysis as to all single contributions of each load to the helicopter's total load.

According to a further preferred method of the invention the detected loads are summed up to determine the helicopter's total load at any of the intermediate and the final reference points.

According to a further preferred method of the invention the respective weights at each weighing cell integral to a flange between fuselage and struts are detected and the center of gravity of the helicopter is derived from said weights at said flanges by means of the control unit.

According to a further preferred method of the invention the weight of any external lifting gear carried by the landing gear is detected principally the same way as the net weight of the helicopter by subtracting by means of the data processor the known net weight of the landing gear of the helicopter from the transmitted weight signal after take off. The pilot may then set a reference point via the input means. If with the ongoing take off the helicopter may take up an external load by means of the external lifting gear and detection, transmission and storage of the external load weight is effected essentially the same way as the net weight of the helicopter by subtracting by means of the data processor the known net weight of the landing gear and the detected weight of the external lifting gear from the weight signal transmitted after take off and after the external load is clear from the ground. The pilot may then set another reference point via the input means. The external load may be added to the detected weight of the helicopter to sum up the operating weight. The known weight of the landing gear can also be manually entered into the control unit by input from display/control or by using the data port to load the data.

BRIEF DESCRIPTION OF THE DRAWINGS

Preferred embodiments of the present invention are presented with the following detailed description by means of the attached drawings.

DETAILED DESCRIPTION OF THE PREFERRED EMBODIMENTS

Figure 1:
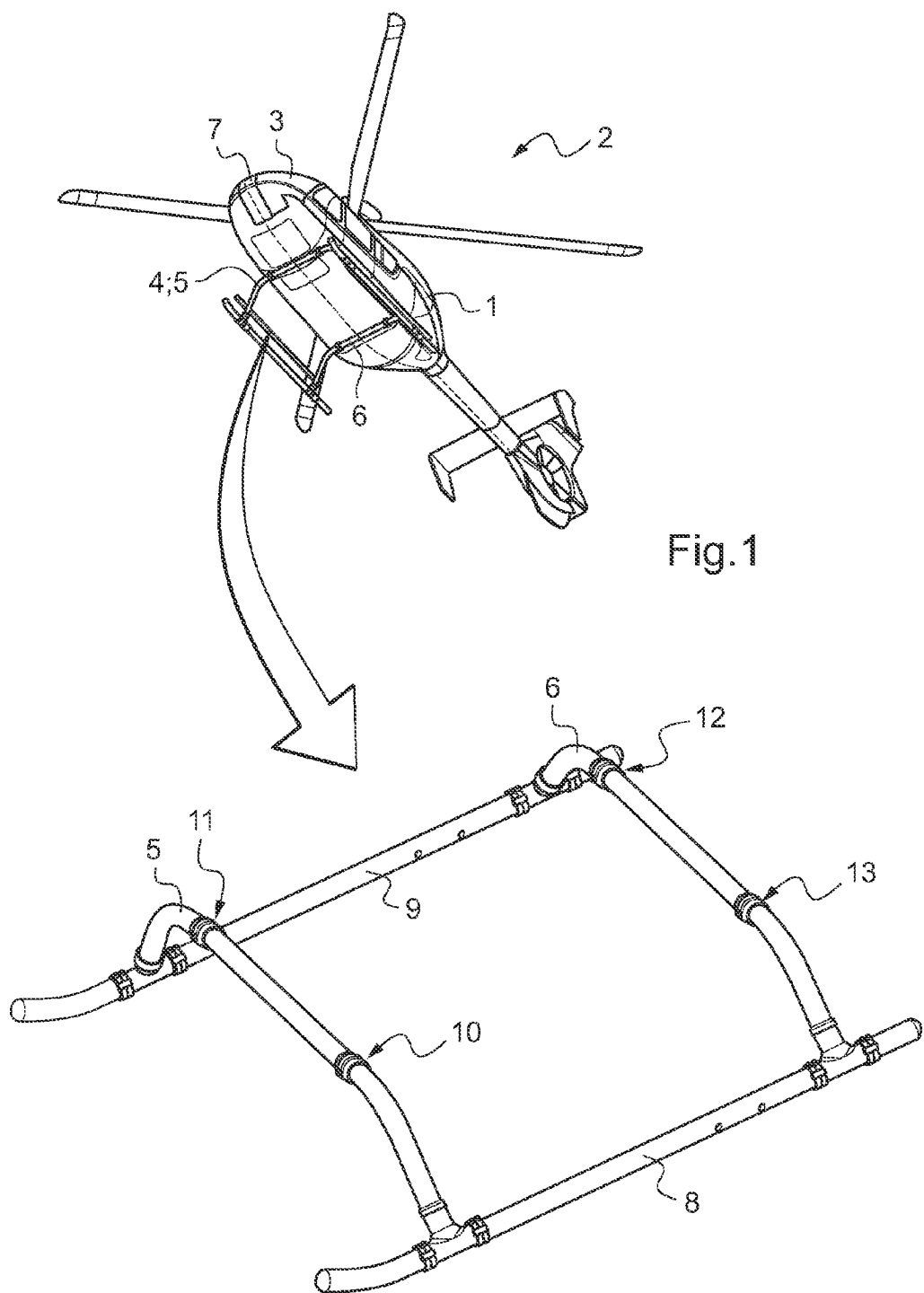
FIG. 1 shows a schematic view of a helicopter with a landing gear according to the invention.

According to FIG. 1 a fuselage 1 of a helicopter 2 with a forward end 3 is provided with a skid type landing gear 4 comprising a bow shaped front strut 5 and a bow shaped rear strut 6 each extending essentially transversely and symmetrically to a longitudinal axis 7 of the helicopter 2. Skids 8, 9 are connected to the respective ends on either side of the struts 5, 6 of the helicopter 2.

Each of the bow-shaped struts 5, 6 is fixed by means of two flanges 10-13 to the fuselage 1.

Figure 2:
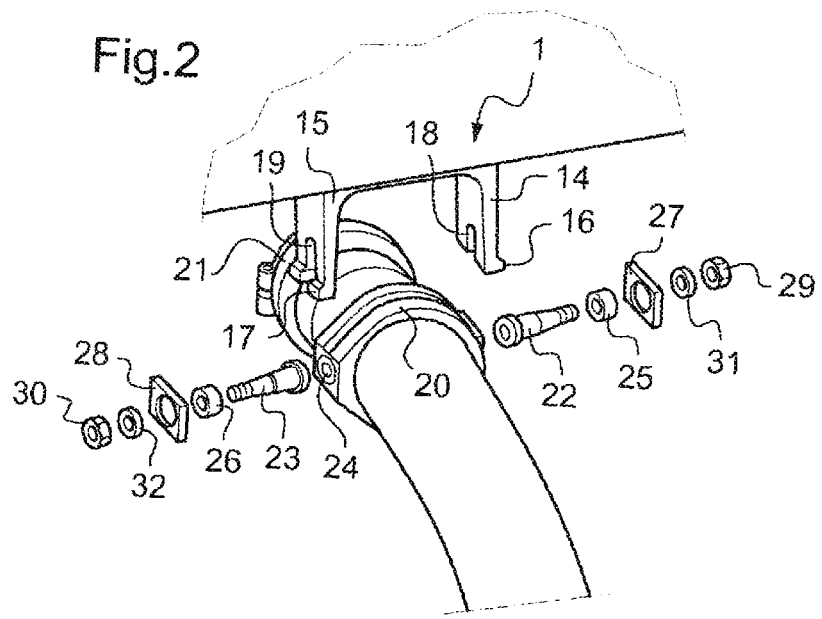
FIG. 2 shows a detail of the landing gear of FIG. 1.
Figure 3:
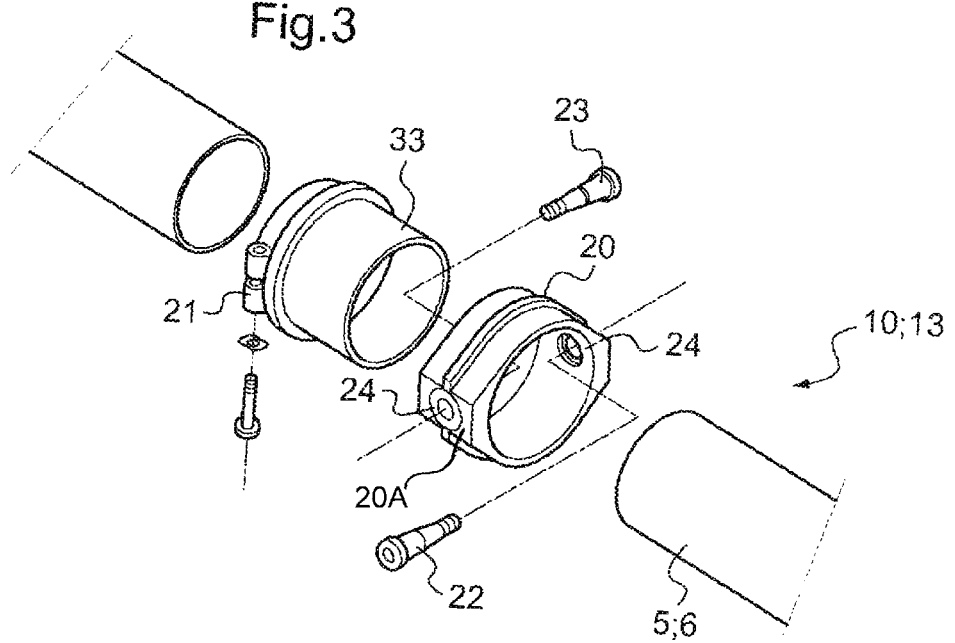
FIG. 3 shows an exploded representation of the detail of FIG. 2.
Figure 4:
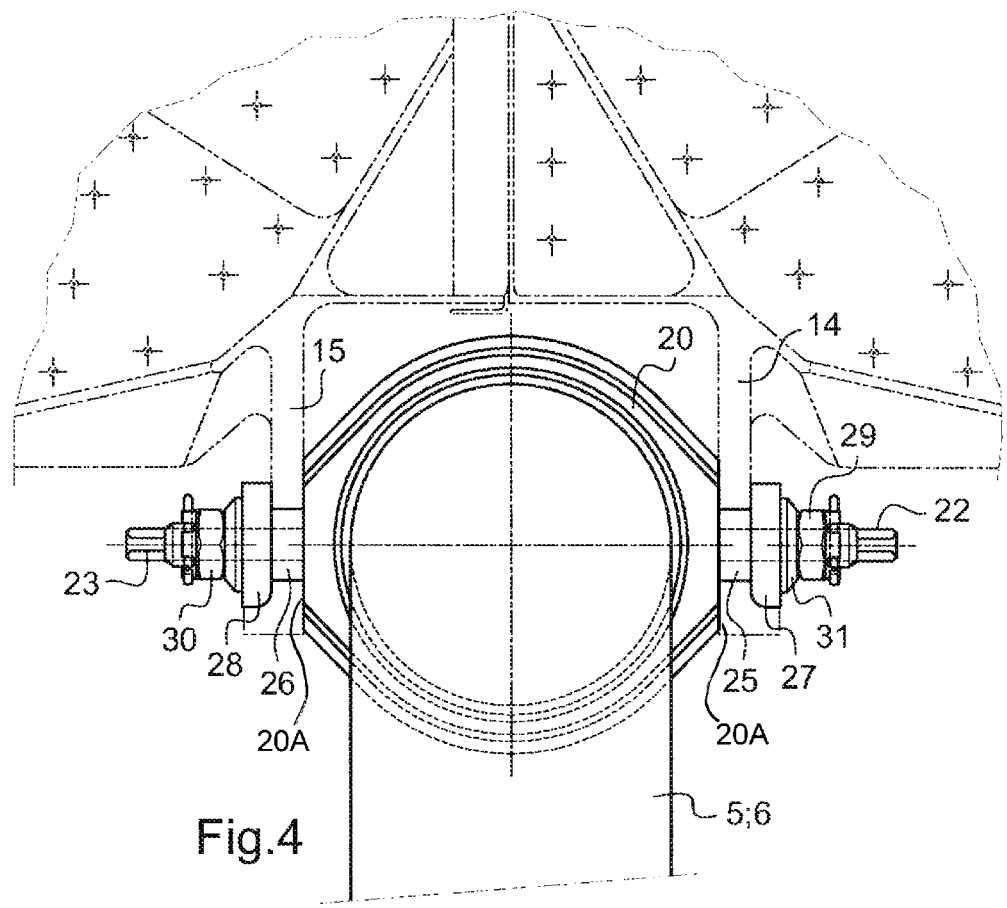
FIG. 4 shows a cross sectional view of a mounted assembly of landing gear according to the invention.

According to FIG. 2-4 one of the flanges 10-13 for fixing any of the bow shaped struts 5, 6 to the fuselage 1 is shown. Corresponding features are designated with the same references as in FIG. 1. The fuselage 1 is provided with two fork type projections 14, 15 separated from and facing each other for each of the flanges 10-13. Rims 16, 17 pointing away from each other extend along the lower edge of each of the two fork type projections 14, 15 and an essentially centric groove 18, 19 is provided from below in each of the two fork type projections 14, 15.

Each of the flanges 10-13 around one of the bow shaped struts 5, 6 is formed by an essentially annular aluminium casing 20, with each of said casings 20 surrounding one of the respective bow shaped struts 5, 6. A synthetic damping element 33 is adapted with its outer circumference to the inner circumference of the aluminium casing 20 and with its inner circumference to the outer circumference of the respective bow shaped strut 5, 6. Each of the synthetic damping elements 33 and the aluminium casings 20 are shifted onto the respective bow shaped struts 5, 6 before the skids 8, 9 are mounted to said respective bow shaped struts 5, 6. Each of the damping element 33 is fixed at a predetermined position to the respective bow shaped strut 5, 6 by a screw tightened circlip 21 and the aluminium casing 20 is shifted onto the damping element 33 to be fixed into the centric grooves 18, 19 of the two fork type projections 14, 15.

Bolts 22, 23 are provided through an essentially horizontal boring 24 on either side of the casing 20, said essentially horizontal borings 24 being located in essentially vertically oriented, flattened areas 20A of the casing 20 said flattened areas 20A being adapted for insertion along the respective insides of the fork type projections 14, 15 with the bolts 22, 23 fitting into the grooves 18, 19 and extending respectively radial through one of said grooves 18, 19 from the inside to the outside of said two fork type projections 14, 15. Bushings 25, 26 are fitted onto each of the bolts 22, 23 after their installations through the essentially horizontal borings 24 before they are fitted into the grooves 18, 19, said bushings 25, 26 being fitted into the centric grooves 18, 19 of the fork type projections 14, 15 in order to transfer any loads from the fuselage 1 to the struts 5, 6 and vice versa.

An essentially rectangular aluminium type element 27, 28 is fixed from outside the fork type projections 14, 15 onto the bolts 22, 23 and a nut 29, 30 is fixed (screwed) onto each of the respective free ends of each of the bolts 22, 23 after a retaining ring 31, 32 has been inserted onto the bolts 22, 23 from outside of the essentially rectangular aluminium type element 27, 28. Each of the essentially rectangular aluminium type elements 27, 28 interacts with its respective rim 16, 17 of the two fork type projections 14, 15 to hold each of the bolts 22, 23 in its respective groove 18, 19.

Figure 5:
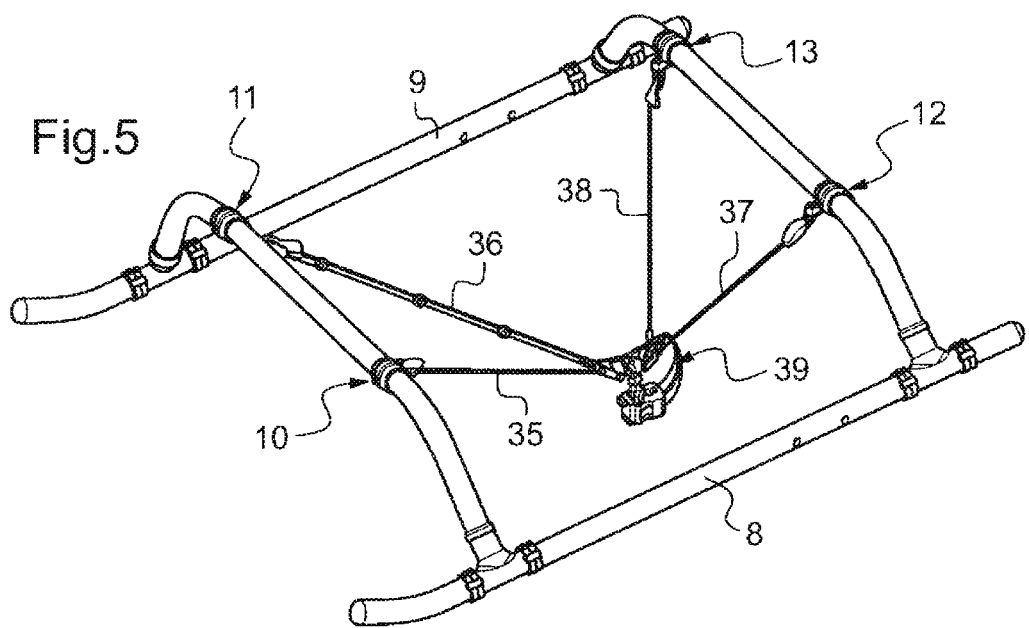
FIG. 5 shows a landing gear with a lifting gear for an external load according to the invention.

According to FIG. 5 an external lifting gear comprising ropes 35-38 is provided. Corresponding features are designated with the same references as in FIG. 1-4. The ropes 35-38 are attached to the struts 5, 6 next to each of the respective flanges 10-13 and interconnected by a load hook 39 for taking up external loads.

Figure 6:
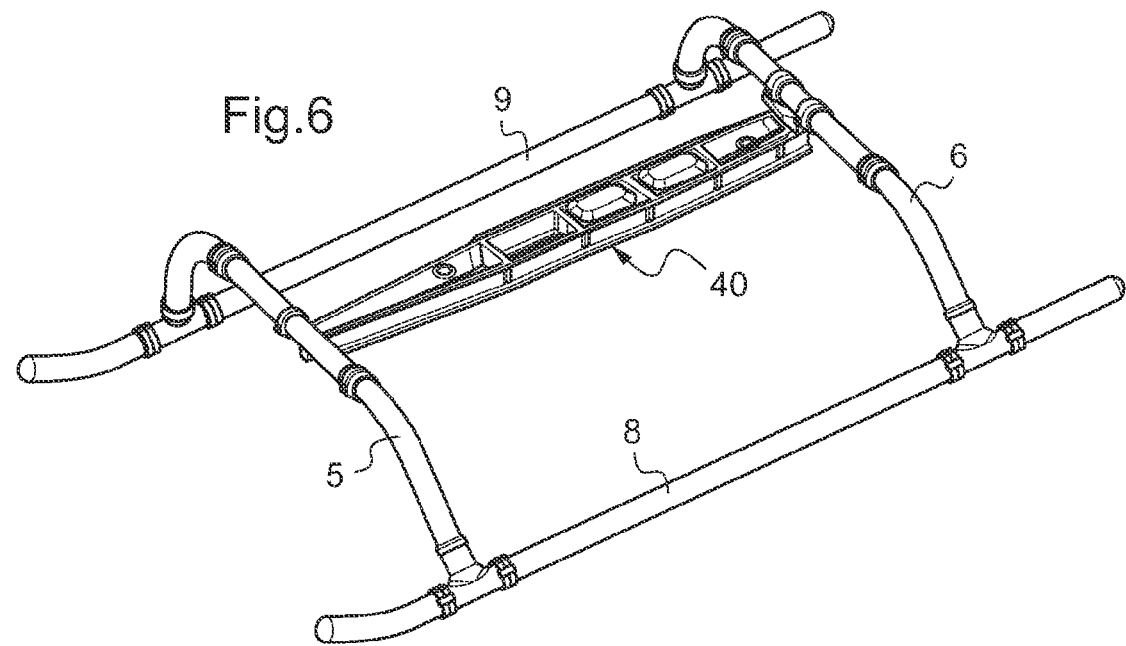
FIG. 6 shows a landing gear with a further embodiment for a lifting gear according to the invention.

According to FIG. 6 corresponding features are designated with the same references as in FIG. 1-5. An external lifting gear of bars 40 is mounted to the struts 5, 6 along a longitudinal mid axis of the transversal bow shaped struts 5, 6 of the landing gear 4 for holding said load hook (not shown).

Figure 7:
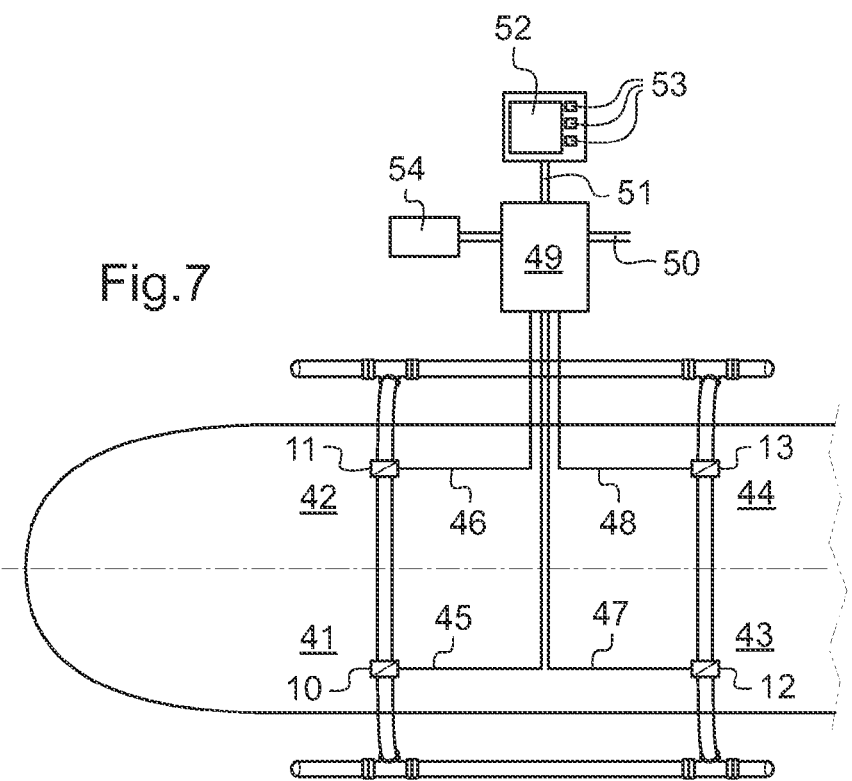
FIG. 7 shows a schematic electric circuit for a landing gear according to the invention.

According to FIG. 7 weighing cells 41-44 integral with the flanges 10-13 are provided to detect any load on the flanges 10-13. Corresponding features are designated with the same references as in FIG. 1-6. The weighing cells 41-44 are configured as strain gauges or load pins and adapted to detect weight from pressure or strain exerted on said weighing cells 41-44. The respective weighing cells 41-44 are connected via connection means 45-48, i. e. electric cables and a first interface to a control unit 49. The control unit 49 is provided with data storage and processing means (not shown) for real time calculations of the center of gravity and total weight of the helicopter 2. The control unit 49 is supplied from an airborne power supply system 50.

The control unit 49 is provided with a second interface and communication means 51 for transfer of data resulting from said calculations in the control unit 49 to a display 52 in a helicopter's cockpit, said display 52 presenting the take off weight and the location of the center of gravity of the helicopter 2 as a chart. The display 52 is provided with input means 53 allowing the selection of different modi, such as operation or maintenance and for setting of reference points for additional measurements, as for example for operation with a load hook 39.

The control unit 49 comprises an external interface 54 for programming and loading of data from a helicopter's universal maintenance system "HUMS" and/or from a lap top.

Method to operate the weighing system for detecting total weight and monitoring of center of gravity of a helicopter Before take off the weighing system is operated by detecting in a first step the net weight of the helicopter 2 without the weight of the skid type landing gear 4 by the weighing cells 41-44 integral with the flanges 10-13. This net weight can be summed up from the weight signals from each of the weighing cells 41-44 and set as a reference point in the control unit 49 by the operator, i. e. the pilot, via the input means 53 of the display 52.

The weight signals from each of the weighing cells 41-44 are processed in the control unit 49 to detect the center of gravity of the helicopter 2 and indicate said center via the display 52 to the operator.

The next steps may be fuelling of the helicopter 2, detecting the fuel weight by subtracting the net weight of the helicopter 2 from the weight indicated real time from the weighing cells 41-44 and setting a respective reference point in the control unit 49 by the operator. A corresponding method applies to any passengers or cargo added to the helicopter. The entire weight of the helicopter 2 at take off corresponds to the weight indicated real time by the weighing cells 41-44 plus the weight of the skid type landing gear 4. As a result of the processing in the control unit 49 by means of the installed software and the communication to the display 52 the operator can see the weight of the helicopter 2 at any interim step and any of the corresponding locations of the respective centers of gravity of the helicopter 2 on the display 52 in front of him.

After take-off the weighing system may detect the weight of the external lifting gear 35-40 with the load hook 39 once said load hook 39 is clear from the ground. The sum of the weights detected at the weighing cells 41-44 represents the weight of the landing gear 4 plus the weight of the external lifting gear 35-40 with the load hook 39. Said weight may be signalled to the display 52 and a reference point may be set in the control unit 49 by the operator by using the input means 53 at the display 52. In general the weight of the landing gear 4 as such will be known and stored beforehand in the data storage of the control unit 49, said known weight may be used to detect the weight of the external lifting gear by subtracting in the control unit 49 the known weight of the landing gear 4 from the summed up online signal from the weighing system once the external lifting gear and the landing gear 4 are free from the ground. An external load may be attached to the load hook 39 of the external lifting gear and the weight of the external load can be detected by the weighing cells 41-44 if said external load is added after the external lifting gear and the landing gear 4 are free from the ground. The external load may be signalled from the weighing cells 41-44 to the control unit 49 and display 52 and a reference point may be set in the control unit 49 by the operator.

The overall weight of the helicopter 2 during flight is the sum of the weights detected before take off plus the sum of the weights detected after take off and may be presented with the corresponding center of gravity via the helicopter's display 52.

All detected and set values of weight with or without corresponding centers of gravity may be retrieved from the data storage for further analysis related to critical structural stresses, for example after a hard landing. Data related to transported loads, load cycles and durations of duty flights with external loads may be retrieved for accounting purposes, for life cycle calculations and/or maintenance intervals.

What is claimed is:

1. A weighing system for detecting total weight, including optional external loads, and monitoring of center of gravity of a helicopter, comprising:

a fuselage of the helicopter,
   a landing gear, mounted to the fuselage by flanges,
   weighing cells integrated into said flanges,
   a control unit for calculations of the center of gravity and total weight of the helicopter, and
   connection means from said weighing cells to the control unit for transfer of weights detected by said weighing cells;
   wherein each of said flanges has two fork type projections separated from and facing each other; and
   wherein attachment means for an external lifting gear are provided at the landing gear for any external loads.

2. The system according to claim 1, wherein the control unit is provided with data storage means for calculations of the center of gravity and total weight of the helicopter and communication means for transfer of data resulting from said calculations in the control unit to at least one display in the helicopter's cockpit.

3. The system according to claim 1, wherein the landing gear is a skid type landing gear comprising two struts with two flanges between fuselage and each strut and/or one strut with one flange.

4. The system according to claim 1, wherein each of the flanges comprises an essentially annular aluminium casing and each of said casings is fixed onto the respective bow shaped strut with a respective damping element inside of said two fork type projections.

5. The system according to claim 1, wherein the control unit comprises a data amplifier, a data processor with software and a data storage.

6. The system according to claim 1, wherein the control unit comprises at least one first interface for the connection means from said weighing cells and at least one second interface for a communication means to at least one display.

7. The system according to claim 1, wherein the at least one display comprises input means.

8. The system according to claim 1, wherein the control unit comprises at least one external data interface.

9. The system according to claim 1, wherein the control unit comprises at least one interface towards a helicopter's maintenance system.

10. The system according to claim 1, wherein the weighing cells comprise strain gauges.

11. The system according to claim 1, wherein a load hook is provided, said load hook being mounted to the landing gear by means of a system of bars and/or ropes, the weight of said load hook being detectable by said weighing cells.

12. A method to operate the system according to claim 1, wherein detecting the net weight of the helicopter by means of the weighing cells, transmitting said detected net weight via at least one first interface for the connection means from said weighing cells to the control unit, storing said detected net weight in a data storage of said control unit, presenting said detected net weight via communication means in a display and setting a reference point via an input means at the display via at least one second interface for the communication means in said control unit, fuelling, detecting, transmitting and storing the fuel weight the same way as the net weight of the helicopter by subtracting by means of a data processor of said control unit the net weight of the helicopter from the transmitted weight signal after fuelling and setting another reference point via the input means at the display.

13. The method according to claim 12, wherein summing up the detected loads and storing the sum in the data storage of the control unit.

14. The method according to claim 12, wherein calculating by means of the data processor of the control unit the center of gravity of the helicopter from said detected weights at said weighing cells.

15. The method according to the preamble of claim 12, wherein taking off with the helicopter, taking up any external lifting gear attached to its landing gear, detecting, transmitting and storing the weight of the external lifting gear the same way as the net weight of the helicopter by subtracting by means of the data processor the known net weight of the landing gear of the helicopter from the transmitted weight signal, setting a reference point via the input means, taking up an external load by means of the external lifting gear and detecting, transmitting and storing the external load weight the same way as the net weight of the helicopter by subtracting by means of the data processor the known net weight of the landing gear and the detected weight of the external lifting gear from the weight signal transmitted after take off and after the external load is clear from the ground.

16. A weighing system for detecting total weight, including optional external loads, and monitoring of center of gravity of a helicopter, comprising:
   a series of flanges for mounting a landing gear to a fuselage of the helicopter, wherein each flange is connected to the fuselage using a pair of fork like projections spaced apart and facing one another, each flange having:
      an annular damping element surrounding a strut of the landing gear,
      a annular casing surrounding the damping element and having a pair of flattened areas defining a pair of borings, and
      an integral weighing cell,
      wherein the flattened areas of the casing mate with an inside surface of the pair of fork like projections and a pair of bolts extend through the boring in the casing and a groove in the fork like projection such that the landing gear is mounted to the fuselage;
   external lifting gear for external loads, the external lifting gear connected to the struts of the landing gear adjacent to the series of flanges; and
   a control unit in communication with the weighing cells and configured to calculate a center of gravity and a total weight during flight of the helicopter based on a signal from the weighing cells, the total weight during flight being the sum of a weight detected before take off and a weight detected after take off and when clear of ground.

* * * * *